(12) United States Patent
Morris

(10) Patent No.: US 11,724,224 B2
(45) Date of Patent: Aug. 15, 2023

(54) BARRIERS AND FILTERS

(71) Applicant: Ertec Environmental Systems LLC, Alameda, CA (US)

(72) Inventor: Vincent. P. Morris, Oakland, CA (US)

(73) Assignee: ERTEC ENVIRONMENTAL SYSTEMS LLC, Alameda, CA (US)

( * ) Notice: Subject to any disclaimer, the term of this patent is extended or adjusted under 35 U.S.C. 154(b) by 81 days.

(21) Appl. No.: 16/449,427

(22) Filed: Jun. 23, 2019

(65) Prior Publication Data
US 2019/0308120 A1 Oct. 10, 2019

Related U.S. Application Data

(63) Continuation of application No. 15/085,184, filed on Mar. 30, 2016, now Pat. No. 10,335,724.

(60) Provisional application No. 62/141,217, filed on Mar. 31, 2015.

(51) Int. Cl.
*B01D 39/16* (2006.01)
*B01D 29/03* (2006.01)

(52) U.S. Cl.
CPC ........ *B01D 39/1692* (2013.01); *B01D 29/03* (2013.01); *B01D 2029/033* (2013.01); *B01D 2239/065* (2013.01)

(58) Field of Classification Search
None
See application file for complete search history.

(56) References Cited

U.S. PATENT DOCUMENTS

| | | | |
|---|---|---|---|
| 929,728 A | 8/1909 | Taylor | |
| 1,618,288 A | 2/1927 | Kinzie | |
| 2,341,515 A | 2/1944 | Reyfeld | |
| 3,112,262 A | 11/1963 | Parkinson | |
| 3,455,112 A | 7/1969 | Twele | |
| 4,279,535 A | 7/1981 | Gagliardi | |
| 4,301,996 A | 11/1981 | Holyoak | |
| 4,721,408 A | 1/1988 | Hewlett | |
| 4,804,299 A | 2/1989 | Forte | |
| 4,854,773 A | 8/1989 | Nicoll | |
| 5,097,624 A * | 3/1992 | Klayman | ............... A01G 13/10 47/31 |
| 5,108,224 A | 4/1992 | Cabaniss | |
| 5,157,867 A | 10/1992 | Fritch | |
| 5,257,878 A | 11/1993 | Peterson | |
| 5,338,131 A | 8/1994 | Bestmann | |
| 5,492,551 A | 2/1996 | Wolfe | |
| 5,575,584 A | 11/1996 | Hsu | |
| 5,584,600 A | 12/1996 | Langdon | |
| 5,605,416 A | 2/1997 | Roach | |
| 5,633,888 A | 5/1997 | Chinn et al. | |
| 5,641,243 A | 6/1997 | Hsu | |

(Continued)

FOREIGN PATENT DOCUMENTS

| | | |
|---|---|---|
| CA | 2533232 | 7/2006 |
| GB | 2171131 | 8/1986 |
| WO | WO 2007/005895 | 1/2007 |

*Primary Examiner* — Jason M Greene
(74) *Attorney, Agent, or Firm* — T. H. P. Richardson

(57) ABSTRACT

An elongate barrier comprising an elongate apertured load-bearing sheet material and an elongate apertured filter material attached to the load-bearing sheet material. The length of the filter material can be changed elastically so that the barrier material can be transported in the form of a roll which can be unrolled for installation.

20 Claims, 3 Drawing Sheets

(56) References Cited

U.S. PATENT DOCUMENTS

| | | |
|---|---|---|
| 5,733,825 A | 3/1998 | Martin et al. |
| 5,944,443 A | 8/1999 | Benedict |
| 5,954,451 A | 9/1999 | Presby |
| 5,954,952 A | 9/1999 | Strawser |
| 6,017,166 A | 1/2000 | Mossburg |
| 6,109,835 A | 8/2000 | Grabhorn |
| 6,214,216 B1 | 4/2001 | Isaacson |
| 6,277,473 B1 | 8/2001 | McGinn |
| 6,332,737 B1 | 12/2001 | Mattson |
| 6,422,787 B1 | 7/2002 | Mikell |
| 6,497,532 B1 | 12/2002 | McGinn |
| 6,505,996 B1 | 1/2003 | Iannello et al. |
| 6,547,493 B2 | 4/2003 | Spangler et al. |
| 6,551,505 B2 | 4/2003 | Chinn et al. |
| 6,641,335 B1 | 11/2003 | Allard |
| 6,709,579 B1 | 3/2004 | Singleton et al. |
| 6,733,209 B2 | 5/2004 | Allard |
| 6,811,708 B2 | 11/2004 | Shaw et al. |
| 6,848,866 B1 | 2/2005 | McGinn |
| 6,905,289 B1 | 6/2005 | Sanguinetti |
| 6,929,425 B1 | 8/2005 | Kimberlin et al. |
| 6,974,540 B1 | 12/2005 | Fleischman |
| 7,008,144 B2 | 3/2006 | McGinn |
| 7,131,787 B2 | 11/2006 | McGinn |
| 7,172,372 B2 | 2/2007 | McGinn |
| 7,544,016 B2 | 6/2009 | McGinn et al. |
| 7,955,030 B2 | 6/2011 | McGinn et al. |
| 8,402,630 B2 | 3/2013 | McGinn et al. |
| 10,335,724 B1 * | 7/2019 | Morris ............... B01D 39/1692 |
| 2001/0037982 A1 | 11/2001 | Pulek |
| 2002/0020658 A1 | 2/2002 | Isaacson |
| 2002/0172564 A1 | 11/2002 | Brown |
| 2003/0095833 A1 | 5/2003 | Janz |
| 2003/0143026 A1 | 7/2003 | Santha |
| 2005/0089376 A1 | 4/2005 | Maxwell et al. |
| 2005/0138906 A1 * | 6/2005 | Kubokawa ......... B01D 39/1623 55/497 |
| 2006/0039761 A1 * | 2/2006 | McGinn ................. E02B 3/043 405/302.6 |
| 2006/0226406 A1 | 10/2006 | Vise |
| 2007/0280789 A1 | 12/2007 | Mason |
| 2008/0157044 A1 | 7/2008 | Barfield |
| 2010/0154347 A1 | 6/2010 | Jessen |
| 2011/0311318 A1 | 12/2011 | Taylor |
| 2013/0309012 A1 | 11/2013 | Lancaster |
| 2016/0279575 A1 | 9/2016 | Kobuke |

* cited by examiner

BARRIERS AND FILTERS

CROSS-REFERENCE TO RELATED APPLICATIONS

This application is a continuation-in-part of co-pending application Ser. No. 15/085,184, filed Mar. 30, 2016, now Patent No. 10,335,724. This application, and the co-pending application Ser. No. 15/085,184, claim priority from Provisional Application No. 62/141,217, filed Mar. 31, 2015 by Vincent P Morris. The entire disclosure of each of application Ser. No. 15/085,184 and Application 62/141,217 is incorporated by reference in this application for all purposes.

This application is related to U.S. Pat. Nos. 6,848,866, 7,008,144 7,131,787, 7,172,372, 7,955,030 and 8,402,630. The entire disclosure of each of those patents is incorporated by reference in this application for all purposes.

BACKGROUND TO THE INVENTION

It is often desirable to install a fence which will stem the flow of sediment-bearing water directed against the fence and remove sediment from the sediment-bearing water. For this purpose, it is conventional to use a barrier material which comprises (1) an apertured load-bearing material and (2) a filter material which (i) is secured to the load-bearing material and (ii) comprises apertures which are smaller than the apertures in the load-bearing material. The known barrier materials of this kind make use of filter materials such that the barrier materials cannot be rolled up (as is desirable for storage and transportation). As a result, the known barrier materials must be stored, transported and installed in short sections.

BRIEF DESCRIPTION OF THE INVENTION

This invention provides a novel barrier comprising a novel filter material which remains effective if its length is changed. As a result, the novel barrier can be in the form of a roll which can be stored, transported to the jobsite and, if desired, installed over an extensive length.

A first aspect of the invention is a barrier which comprises (1) an elongate load-bearing apertured barrier material and (2) an elongate filter material (i) which is attached to at least part of the load-bearing material, (ii) which comprises apertures which are substantially smaller than the apertures in the load-bearing barrier material, and (iii) whose length can be changed without making the filter ineffective.
Because the length of the filter can be changed without making it ineffective, the barrier can be in the form of a roll which can be stored and transported, and can then be unrolled at the jobsite, making it ready for installation.

A second aspect of the invention is a method for installing a barrier, the method comprising
  (A) providing a barrier according to the first aspect of the invention in the form of a roll;
  (B) unrolling the barrier, the length of the barrier material when it is completely unrolled being for example at least 25 feet, particularly at least 50 feet, e.g. 50-300 feet;
  (C) creating a barrier by installing the barrier roll, the barrier being installed as it is unrolled or after it has been unrolled.
In many cases, the direction from which sediment-containing water will be directed against the barrier is known, and in that case, the filter material will face the direction from which the flow of water is expected and the load-bearing material will be on the opposite side. Alternatively, the filter material can be sandwiched between two load-bearing materials.

A third aspect of the invention is a method for cleaning a barrier of the invention which has been in use over a period of time and is, therefore, contaminated. The method comprises removing the barrier, cleaning the removed barrier by a process which preferably includes passing the removed barrier through a plurality of operations, for example over a plurality of rollers on or between which the barrier is cleaned at least partially by water and/or by steam, and optionally by mechanical forces that remove and/or loosen the contaminants. The cleaning operation can remove sediment and/or harmful seeds and/or weeds and/or invasive plants, and render the barrier suitable for further use. The cleaning operation can include rolling up the cleaned barrier into a roll. Because the barrier is in the form of a long length which can be removed and cleaned as one piece, the method is more efficient than the methods presently available for removing and cleaning barriers as a piecemeal operation.

A fourth aspect of the invention is a novel filter material whose length can be changed without making it ineffective as a filter material and which is, therefore, particularly useful as the filter material in the novel barriers of the invention. These novel filter materials are also useful in other contexts.

In a first embodiment of the fourth aspect of the invention, the novel filter material
(1) comprises
  (A) a first set of melt-extruded polymeric strands which are (i) parallel to each other and (ii) spaced apart from each other, and
  (B) a second set of melt-extruded polymeric strands which are (i) parallel to each other, (ii) spaced apart from each other, and (iii) at an angle to the first strands, the angle preferably being 50-80°;
  the first and second sets of polymeric strands (i) being bonded to each other at crossover sections at which the polymeric strands are bonded together, and (ii) forming open apertures which preferably have an aperture size, measured by the procedure of ASTM D-4751, which is less than 500µ (0.500 mm), preferably less than 450 µm, particularly less than 400 µm, for example 200-400 µm, particularly 200-300 µm,
(2) preferably has a percentage open area (measured by COE 02215-86) of at least 20%, e.g. at least 25%, preferably at least 30%, for example 20-60%, particularly about 55%, and
(3) preferably has a thickness of less than 0.060 inch, preferably 0.01-0.04 inch, particularly 0.015-0.03 inch, and
(4) preferably has a length which can be changed elastically by at least 0.05%, preferably at least 0.1%, for example a length of at least 25 feet.
One or both of the polymeric strands can be either a monofilament or a plurality of adjacent filaments, for example twisted together.

In a second embodiment of the fourth aspect of the invention, the filter material comprises
  (A) a first set of polymeric strands which are (i) parallel to each other and (ii) spaced apart from each other, and
  (B) a second set of polymeric strands which are (i) parallel to each other, (ii) spaced apart from each other, and (iii) at an angle to the first strands, the angle preferably being 70-90°;
the first and second sets of polymeric strands (i) being melt-bonded to each other at crossover sections at which the polymeric strands are bonded together, and (ii) forming open apertures;

the filter material having a percentage open area (measured by COE 02215-86) of 8-60%, for example 8-15%, e.g. about 10%; and the apertures preferably having an aperture size, measured by the procedure of ASTM D-4751, which is less than 600 μm (0.500 mm), preferably less than 550 μm, particularly less than 450 μm, for example 300-450 μm, particularly 300-425 μm., and One or both of the polymeric strands can be either a monofilament or a plurality of adjacent filaments, for example twisted together.

In a third embodiment of the fourth aspect of the invention, the filter material
1) comprises
   (A) a first set of polymeric strands, the polymeric strands in the first set being (i) parallel to each other and (ii) spaced apart from each other, and
   (B) a second set of polymeric strands, the polymeric strands in the second set being (i) parallel to each other, (ii) spaced apart from each other, and (iii) at an angle, e.g. at an angle of 70-90°, to the polymeric strands in the first set;
the polymeric strands in the first and second sets of polymeric strands (i) being woven together so that they meet each other at crossover sections at which the polymeric strands are not bonded together, and (ii) forming open apertures which preferably have an aperture size, measured by the procedure of ASTM 0-4751, which is less than 600 μm (0.500 mm), preferably less than 550 μm, particularly less than 450 μm, for example 300-450 μm, particularly 300-425 μm, the filter material having a percentage open area (measured by COE 02215-86) of 8-60%, for example 8-15%, e.g. about 10%; and the apertures preferably having an aperture size, measured by the procedure
of ASTM D-4751, which is less than 600 μm (0.500 mm), preferably less than 550 μm, particularly less than 450 μm, for example 300-450 μm, particularly 300-425 μm., and the filter material preferably having a percentage open area (measured by COE 02215-86) of at least 8%, for example 8-60%, e.g. 8-15%, particularly about 10%, the filter material preferably having a thickness of less than 0.060 inch, preferably 0.01-0.04 inch, particularly 0.015-0.03 inch, and the filter material having a length which preferably can be changed elastically by at least 0.05%, particularly at least 0.1%, for example a length of at least 25 feet One or both of the polymeric strands can be either a monofilament or a plurality of adjacent filaments, for example twisted together.

BRIEF DESCRIPTION OF THE DRAWINGS

The invention is illustrated in the accompanying drawings which are exemplary, diagrammatic and not to scale.

DETAILED DESCRIPTION OF THE INVENTION

Figure 1:
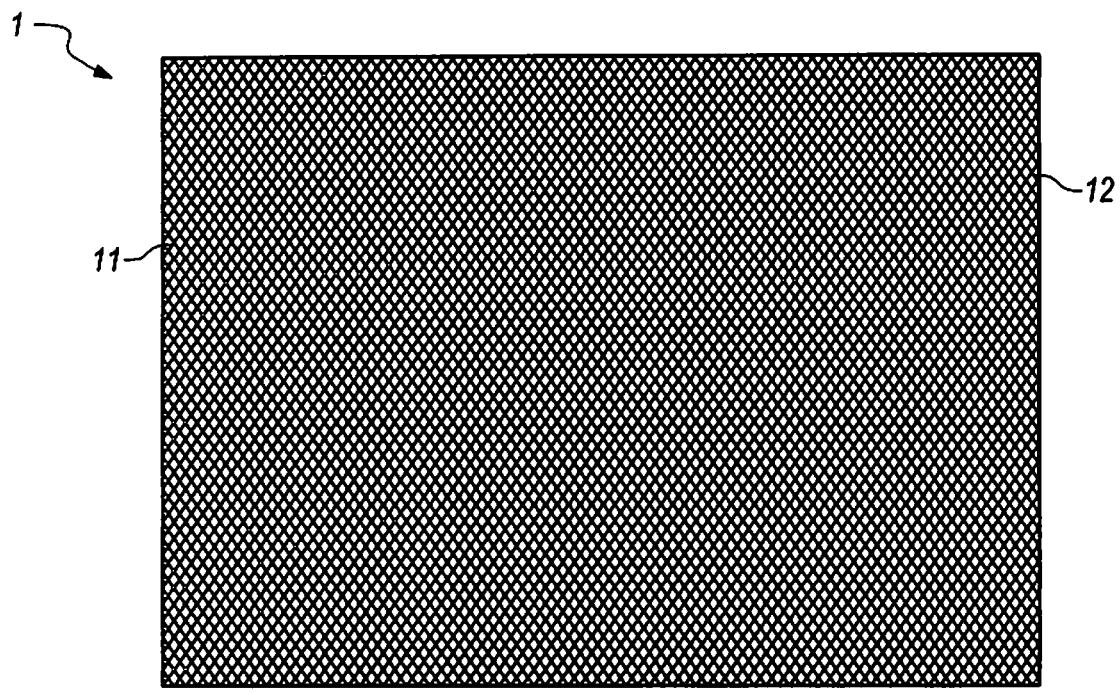
FIG. 1 is a plan view of a small section of an example of the novel filter which provides the fourth aspect of the invention

In the Summary of the Invention above, the Detailed Description of the Invention, the Examples, and the claims below, and the accompanying drawings, reference is made to particular features (including for example components, ingredients, elements, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used in combination with other particular aspects, embodiments, claims and Figures, and in the invention generally, except where the context excludes that possibility. The invention disclosed herein, and the claims, include embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, a composition or device "comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example, "at least 25" means 25 or more than 25. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When a range is given as "(a first number) to (a second number)" or "(a first number)-(a second number)", this means a range whose lower limit is the first number and whose upper limit is the second number. For example, "0.1 to 0.5 inch" or "0.1-0.5 inch" means a range whose lower limit is 0.1 inch, and whose upper limit is 0.5 inch. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps, except where the context excludes that possibility. Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features (except where the context excludes that possibility). Thus, there may be a single such feature or a plurality of such features. Where reference is made herein to two or more features, this includes the possibility that the two or more features are replaced by a lesser number or greater number of features which provide the same function, except where the context excludes that possibility. The numbers given herein should be construed with the latitude appropriate to their context and expression; for example, each number is subject to variation which depends on the accuracy with which it can be measured by methods conventionally used by those skilled in the art.

If any element in a claim of this specification is considered to be, under the provisions of 35 USC 112, an element in a claim for combination which is expressed as a means or step for performing a specified function without the recital in the claim of structure, material, or acts in support thereof, and is, therefore, construed to cover the corresponding structure, material, or acts described in the specification and equivalents thereof, then the corresponding structure, material, or acts in question include such structure, material, or acts described in the US patent documents incorporated by reference herein and the equivalents of such structure, material, or acts.

The Load-Bearing Apertured Barrier Material

The load-bearing apertured barrier material can be of any kind. The lower part of the barrier material (when the barrier material is part of an installed barrier) preferably contains apertures that make it possible for it to pass at least some, and preferably substantially all, of any sediment-bearing water directed against it. The upper part of the barrier material, when the barrier installed, can have sufficient apertures that it does not provide a substantial barrier to wind. The apertures can be uniformly or non-uniformly distributed. For example, the density and/or size of the apertures can vary with the distance from the bottom of the load-bearing material. The apertures can be of the same or different sizes and/or shapes, for example round, rectangular (including square), star or diamond. Preferably, the load-bearing barrier material can be recycled.

(1) In a first embodiment, the load-bearing barrier material comprises, and may consist essentially of,
  (A) a first set of melt-extruded polymeric strands which are parallel to each other and spaced apart from each other, preferably with a distance between adjacent strands of 0.1 to 0.5 inch, for example 0.1 to 0.3 inch, and
  (B) a second set of melt-extruded polymeric strands which are parallel to each other, are spaced apart from each other, preferably with a distance between adjacent strands of 0.1 to 0.5 inch, for example 0.1 to 0.3 inch, the strands in the second set being at an angle to the strands in the first set;
the first and second sets of polymeric strands (i) intersecting at crossover sections at which the polymeric strands are bonded together, and (ii) forming open apertures which have a first aperture size, measured by the procedure of ASTM D-4751.

One or both of the polymeric strands can be either a monofilament or a plurality of adjacent filaments, for example twisted together. Preferably, each of the first and second polymeric strands has a thickness in the laminar dimension of the sheet between the crossover points of 0.04 to 0.5 inch. The apertures can for example have an aperture size, measured by the procedure of ASTM D-4751, which is less than 500µ (0.500 mm), preferably less than 450µ, particularly less than 400µ, for example 200-400 microns, particularly 200-300 microns.

The load-bearing apertured material of the first embodiment can be produced by a process in which two or more sets of polymeric strands are melt extruded at an angle to each other and the polymeric strands are melt-bonded to each other at crossover points, thus producing apertures.

(2) In a second embodiment, the load-bearing material is a perforated polymeric sheet. The load-bearing material of the second embodiment can be produced by perforating a polymeric sheet material in order to produce the apertures. The apertures can be made by perforating a polymeric sheet material immediately after it has been produced by melt extrusion or by perforating a preformed polymeric sheet material. In either case, the apertures can for example be produced by a continuous punch press, for example a rotary punch press.

The load-bearing apertured barrier material optionally has one or more of the following characteristics:—

(B1) At least a bottom section, extending for example over the bottom 10-70%, e.g. the bottom 50% or 30%, of the loadbearing material, which has a percentage open area (POA, measured by COE 02215-86) of at least 25%, preferably at least 30%.

(B2) A top section, which can for example extend over the top 70%, e.g. the top 50% or 30%, of the loadbearing material, which has a percentage open area (POA, measured by COE 02215-86) of at least 25%, preferably at least 30%, for example 25-60%, e.g. 35-50%, e.g. about 55%.

(B3) A solid surface area, in the sections which contain apertures, of 1-80%.

(B4) A length which can be changed elastically by at least 0.03%, preferably at least 0.05%, for example at least 0.1%, for example up to 0.5%, or even more, to facilitate its conversion into a roll.

(B5) A weight of 0.12-0.25, e.g. 0.16-0.30, e.g. 0.16-0.19, lb/square foot.

(B6) A tensile strength in the machine direction of at least 400 lb (ASTM D4595) and in the transverse direction of at least 325 lb (ASTM D4595).

(B7) A CBR puncture strength (ASTM D6241) of at least 230 lbs.

(B8) It is composed of a polymer having a Shore Hardness at 68° F. of least 80.

(B9) It contains apertures each having an area which is the same as an aperture having a diameter of 0.1-0.5 inch.

(B10) When it is exposed to ultraviolet radiation, e.g. direct sunlight, for 500 hours, it changes in tensile strength by less than 20%, for example less than 15%, e.g. less than 10%, based on the tensile strength before the test (for example when tested in accordance with ASTM 4355 or ASTM D4595).

(B11) When the bottom section of the load-bearing material is tested by ASTM D4491, it has a flow rate of at least 20, preferably at least 100, gallons per square foot per minute.

(B12) When a 3 foot square sample of the load-bearing material is subjected to a test in which the sample is suspended vertically, with an upper edge of the sample continuously supported and the remainder of the sample hanging freely from the upper support, and the suspended sample is exposed to a temperature of 160° C. for 12 hours and then to a temperature of 20° C. for 1 hour, has a vertical dimension which changes by less than 15%, for example less than 10%, e.g. less than 5%, based on the vertical dimension before the test.

(B13) When a 3 foot square sample of the load-bearing material is subjected to a test in which the sample is supported on a flat horizontal surface and maintained for one hour at 100° C. and then at 20° C. for two hours, the sample does not change in any horizontal dimension by more than 5%, for example more than 3%, e.g. more than 1.5%, based on that dimension before the test.

(B14) It is composed of a polymeric material that can be recycled.

(B15) It is composed of a polymeric material having a tear strength at 20° C. of at least 15, e.g. 18-25, Newtons per square millimeter.

(B16) it is composed of a polymeric material having a Shore Hardness at 20° C. of at least 80, for example 90-100.

(B17) The first and second strands are composed of a polymeric material, preferably the same polymeric material, for example a composition comprising polyethylene, e.g. high density polyethylene.

(B18) In the first embodiment of the load-bearing material (which comprises first and second sets of polymeric strands that are melt-bonded together), the angle between the first and second strands is 30-90°, for example 45-90°, e.g. 60-80°.

(B19) In the first embodiment of the load-bearing material, the width of each of the first and second strands between the crossover points in the plane of the sheet (or if the sheet is not planar, in the laminar dimension of the sheet) is 0.05-0.15 inch, for example about 0.1 inch.

(B20) In the first embodiment of the load-bearing material, the thickness of the sheet at the crossover points at right angles to the plane of the sheet is 0.1-0.2 inch, e.g. 0.12-0.16 inch (B21) In the first embodiment of the load-bearing material, the distance between the centers of the first strands is 0.18-0.35 inch, e.g. 0.22-0.28 inch, for example 0.25 inch, and the distance between the centers of the second strands is 0.18-0.35 inch, e.g. 0.22-0.28 inch, for example 0.25 inch.

(B22) In the first embodiment of the load-bearing material, the distance between adjacent edges of the first strands is 0.12-0.2 inch, for example about 0.15 inch and the distance between adjacent edges of the second strands is 0.12-0.02 inch, e.g. about 0.15 inch.

The Filter Material

The ability of the filter material to change in length is important to the ability of the barrier (comprising the loadbearing material and the filter material) to be rolled up and unrolled. The barrier can make use of the novel filter material defined in the first embodiment of the fourth aspect of the invention (in which the two sets of polymeric strands are melt bonded to each other. Satisfactory results can also be obtained with other filter materials. Two examples of such a filter material are the novel filter materials of the second and third embodiments of the fourth aspect of the invention.

The change in the length of the filter material can result from a change in the shape of the apertures and/or a change in the length of the polymeric strands. The ability (if any) of the load-bearing sheet material to change in length and the nature and durability of the attachment between the filter material and the load-bearing material may also be relevant. When the attachment is made by means of an adhesive, care must be taken to ensure that the presence of the adhesive does not substantially decrease the effectiveness of the filter. Attachment by means of sewing can allow relative movement of the filter material and the load-bearing material as the barrier material is rolled up and unrolled.

The filter material preferably retains its effectiveness as a filter even after exposure of the installed barrier to the elements (sun, wind, rain, wildlife, abrasion etc.) and even after two or more cycles of use The size of the apertures in the filter material is preferably such that the size of the apertures in the load-bearing material is at least 4 times, particularly at least 8 times, the size of the apertures in the filter material, and can be as much as 35 times, e.g. 8-12 times, the size of the apertures in the filter material.

The filter material can be secured to a long length of a load-bearing sheet material to provide a barrier which can be in the form of a roll for storage and transportation purposes, but which can be unrolled for installation along an extended barrier line.

Preferably the filter material has a thickness of less than 60 mils (0.060 inch), preferably 10-40 mils (0.01-0.04 inch), particularly 15-30 mils (0.015-0.03 inch), and a width of at least 4 inch, preferably 6 to 36 inch. A thickness of less than 60 mils is preferred because the thicker the filter material, the more resistant it is to the flow of sediment-bearing water through it, which (when the filter is part of a barrier) can cause rapid, unwanted clogging.

The filter material can be attached to the load-bearing material while both the filter material and the load-bearing material are substantially flat, or when one or both is slightly curved. The resulting composite material can be rolled up with the filter material either inside or outside the load-bearing material.

The width of the filter material can be the same as or less than the width of the load-bearing material. In one embodiment, the filter material extends over at least an upper section of the width of the load-bearing material, leaving a bottom section which does not carry the filter material (and which will be installed in a trench in the ground or on top of the ground). The filter material can extend only part of the way to the top of the load-bearing material, leaving an upper section which is free of filter material. Alternatively, the filter material can extend all the way to the top of the load-bearing material.

The attachment of the filter material to the load-bearing material can be accomplished in any convenient way, providing that the attachment remains sufficiently secure after the filter material and the load-bearing material have been rolled up, and subsequently unrolled for installation as a barrier. Preferably the attachment means is such that, after the barrier has been installed, the barrier can be removed and (optionally after being rerolled) cleaned, and then re-rolled, so that it can be re-installed.

When the filter material is in use as part of a barrier, the smaller the overall size of the filter, the smaller the aperture size of the filter material, and the greater the number of tortuous paths through the filter material, the more likely it is that the filter will be subject to rapid, unwanted clogging.

The filter material optionally has one or more of the following characteristics.

F1. A thickness, measured by ASTM 5199, of less than 60 mils (0.060 inch), preferably 10-40 mils (0.01-0.04 inch), particularly 15-30 mils (0.015-0.03 inch) for example 0.022 inch.

F2. A width of at least 4 inch, preferably 6 to 36 inch.

F3. A length of at least 100 feet, e.g. 200 or 300 feet, from which shorter lengths can be cut when desirable.

F4. An elasticity in the length direction such that the elongation at maximum load, measured by ASTM D4596, is 15-40%, e.g. 27-37%.
F5. A clean water flow rate, measured by ASTM 4491, of at least 170, preferably at least 200 gallons/minute/square feet.
F6. An ultimate tensile strength, measured by ASTM D4595, measured in the width direction of 50-80, e.g. 60-70, pounds
F7. A tensile strength, measured by ASTM D4595, measured in the width direction, of 90-120, e.g. 105-115 pounds
F8. A weight of 0.03-0.05, preferably about 0.04, pounds/square feet.
F9 A nominal CBR puncture strength, measured by ASTM D6241, of 40-70, e.g. 50-60 pounds.
F10. An aperture size, measured by ASTM D 40 751 of at most 550μ, preferably at most 425μ.
F11. A percent open area, measured by ASTM 6767, of 30-70%, preferably 50-60%.
F12. The filter is composed of a polymer having a Shore hardness at 68° F. of 85-110, for example 90-100.
F13. The filter is composed of a polymer having a low temperature brittleness, measured by ASTM D 746 of −80 to −120° F., e.g. about −110° F.
F14. The filter is composed of a polymeric composition that can be recycled, for example a composition comprising polyethylene, e.g. high density polyethylene. The polymeric material can contain an ultraviolet stabilizer.
F15. A distance between the centers of adjacent strands of 0.02-0.04 inch, preferably 0.024-0.029 inch, e.g., about 0.027 inch.
F16. A number of strands per inch (measured perpendicular to the strand direction) which is 30-45, for example 35-40, e.g. about 37.
F17. The angle between the two sets of strands is 50-80°, for example 75°.

Rolls of the Barrier

In one embodiment of the invention, the barrier is in the form of a roll having multiple layers, each of the layers preferably consisting essentially of the load-bearing material and the filter material attached to it. The load-bearing material and the attached filter material can be wrapped around a core having a diameter of, for example, 1-6 inch, for example 2-5 inch, e.g. about 3 inch. The outside diameter of a roll of the barrier having a length of about 100 feet can for example be 14-20 inches. The roll can be transported easily and can be unrolled for installation. Preferably the barrier, after being unrolled, can be re-rolled, for example if installation has to be postponed. After the barrier has been installed, it can preferably be removed after installation, and (optionally after being rerolled) cleaned, and then re-rolled, so that it can be re-installed.

Because the barrier can be initially in the form of a roll, the installation of the barrier can be carried out as a continuous or semi-continuous operation, in contrast to a piecemeal operation necessitated by the finite length of presently available barrier materials which include a filter. For example, the barrier roll can be mounted on a machine for making a trench in the ground and can be unrolled and a lower portion of the barrier is fed automatically into the trench which has just been made. The machine can also bury the lower portion of the barrier after it has been placed in the trench.

The filter material preferably retains its effectiveness as a filter even after long exposure of the installed barrier to the elements (sun, wind, rain, sediment, wildlife, abrasion etc.) and even after two or more such cycles of use.

Preparation of the Filter Materials of the First and Second Embodiments of the Fourth Aspect of the Invention The filter materials of the first and second embodiments of the fourth aspect of the invention can be made by a process which comprises the following steps.

The polymeric material is extruded through a plurality of rotating orifices arranged in a circle. A continuous strand of the polymeric material comes out of each orifice. Each orifice is cut so that part of the circumference of the orifice cylinder is open and exposed to the face of the opposing counter-rotating die orifice cylinders. Each open section of each orifice is the point of contact for the molten strands of polymeric material to bond together as the orifices rotate and expose the molten strand to the molten strand of the opposite die face orifices. As a result, individual polymeric strands are continuously and intermittently bonded to each other as the counter-rotating dies progress through their cycle.
2. The resulting tubular structure is passed over an expander which increases its diameter 2-5 times, and then into a quenching bath.
3. The expanded tubular structure is cut and flattened to form a sheet material. This process forms part of the present invention.

Second Aspect of the Invention

The second aspect of the invention is a method for installing a barrier, the method comprising
(A) providing a barrier in the form of a roll which comprises an elongate load-bearing is apertured material and, attached to the load-bearing material, and elongate filter material which retains its effectiveness as a filter when the roll is unrolled,
(B) unrolling the barrier roll, the length of the barrier when it is completely unrolled preferably being at least 25 feet,
(C) installing the barrier roll, as it is unrolled or after it has been unrolled, to provide a barrier.

The installation of the barrier can be carried out as a continuous or semi-continuous operation, in contrast to the present piecemeal operation which is necessitated by the finite length of presently available barriers which include a filter. In one embodiment, the barrier is installed as part of an integrated operation which comprises making a trench in the ground, placing a lower part of the barrier in the trench immediately after the trench has been made, and filling in the trench around the lower part of the barrier In some embodiments, the barrier is installed by placing a bottom section of the barrier below the ground. Part or all of the section of the barrier that is below the ground can include, but does not necessarily include, the filter material attached to it. At least part of the section of the barrier material that is above the ground has the filter material attached to it. In other embodiments, the barrier is installed by attaching the bottom of the barrier to the ground, without burying it in the ground. Further details of possible installation of the barrier, for example for the control of wildlife, as well as for sediment control, are disclosed in the patents incorporated by reference herein.

Third Aspect of the Invention

The third aspect of the invention is a method for cleaning a barrier which has been installed using the method of the third aspect of the invention, the method comprising (A) removing a long length of the barrier, for example a length of at least 25 feet, from the barrier, and (B) cleaning the removed barrier by a process which includes passing the removed barrier over a plurality of rollers.

Because the barrier is in the form of a long lengths which can be removed and cleaned as one piece, the method is more efficient than the methods presently available for removing and cleaning barriers as a piecemeal operation.

The Drawings

Referring now to the drawings:—

FIG. 1 is a diagrammatic plan view of a small section of an example of the novel filter material which is the fourth aspect of the invention, and which is composed of a first set of melt extruded polymeric strands 11 and a second set of melt extruded polymeric strands 12, which are bonded to each other at crossover sections.

Figure 2:
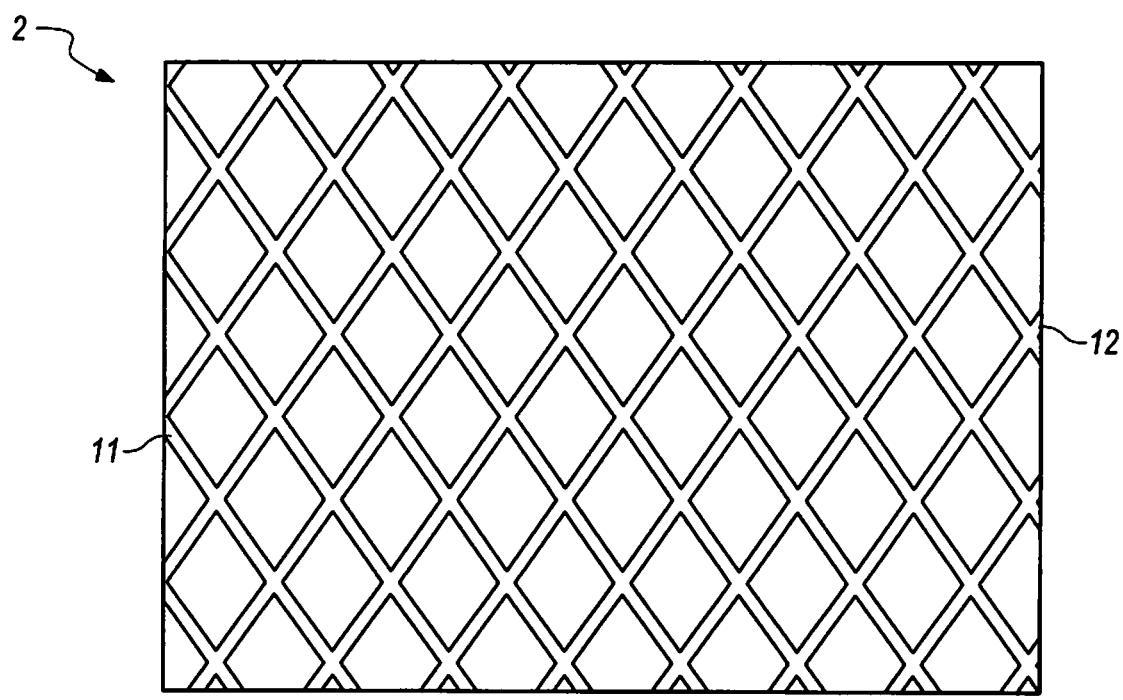
FIG. 2 is a plan view of a small section of the load-bearing sheet material.

FIG. 2 is a diagrammatic plan view of a small section of an example of a preferred load-bearing apertured material, 2, which is composed of a first set of melt extruded polymeric strands 21 and a second set of melt extruded polymeric strands 22, which are bonded to each other at crossover sections.

Figure 3:
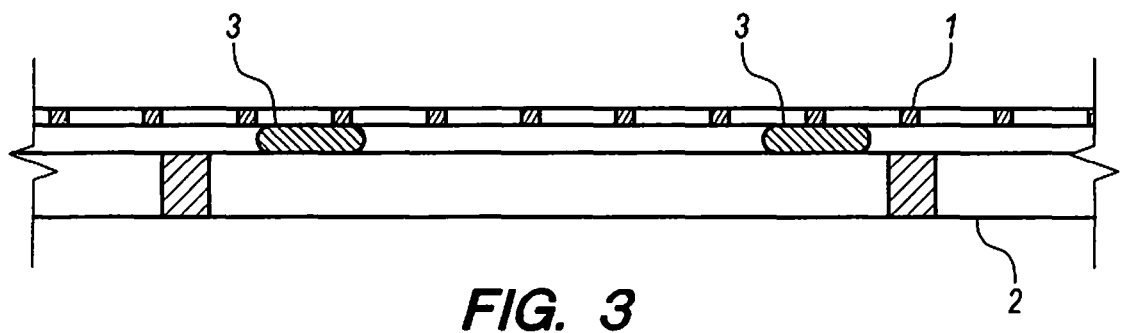
FIG. 3 is a cross-section of a barrier material of the first aspect of the invention.

FIG. 3 is a diagrammatic cross-sectional view of a flat section of an example of a barrier of the invention which comprises a filter material 1, a load-bearing material 2 and connection means 3 securing the filter material and the load-bearing material together.

Figure 4:
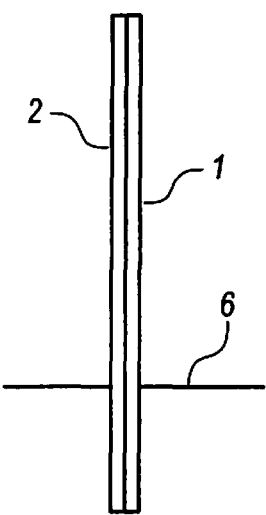
FIGS. 4-6 are side views of examples of different installed barrier materials of the invention.
Figure 5:
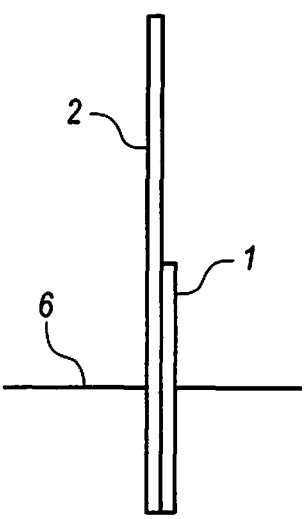
Figure 6:
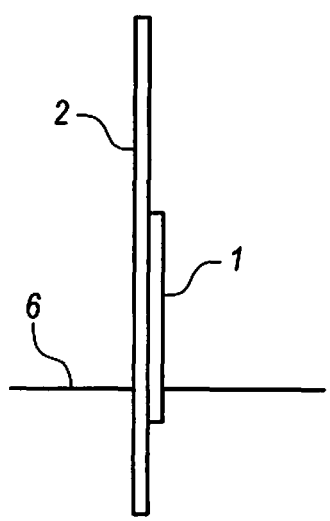

FIGS. 4-6 are diagrammatic side view of examples of different installed barriers incorporating a filter material 1 and an apertured load-bearing material 2 to which the filter 1 is attached. In all the Figures, part of the barrier is below the ground level 6. In FIG. 4, the filter material 1 covers the whole surface of the load-bearing sheet material 2. In FIG. 5, the filter material 1 covers a bottom section of the load-bearing sheet material, and part of the filter material 1 is below the ground and part of it is above the ground. In FIG. 6, the filter material 1 covers an intermediate section of the load-bearing sheet material, and a small part of the filter material 1 is below the ground, and the remainder is above the ground but does not extend to the top of the load-bearing sheet material.

Figure 7:
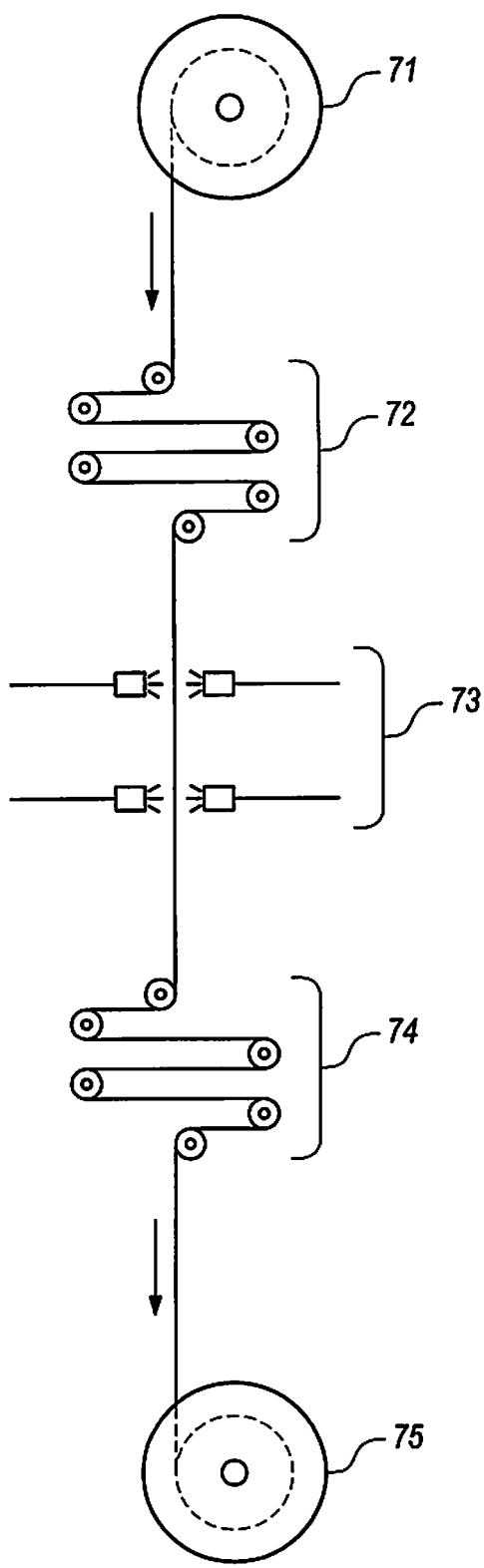
FIG. 7 shows the method of the third aspect of the invention.

FIG. 7 illustrates a process for cleaning a barrier which has been in use (and is, therefore, contaminated by sediment and/or harmful seeds and/or weeds and/or invasive plants) and has been removed. The barrier is rolled up into a roll 1 and then placed on a payoff mechanism. The barrier is removed from the payoff section and passes in turn through (1) a sediment chipping section 72 in which the barrier is subject to mechanical forces that remove and/or loosen the contaminants, (2) a wash station 73 in which it is subject to high pressure water and/or steam and (3) a drying section 74, before being wound up as a roll at a take-off section 75.

The invention claimed is:

1. A barrier material which comprises
   (1) an elongate load-bearing apertured material which comprises apertures and
   (2) an elongate filter material which (i) is attached to at least part of the load-bearing apertured material and (ii) comprises apertures which are substantially smaller than the apertures in the elongate load-bearing apertured material;
wherein the filter material
1) comprises
   (A) a first set of polymeric strands, the polymeric strands in the first set being (i) parallel to each other and (ii) spaced apart from each other, and
   (B) a second set of polymeric strands, the polymeric strands in the second set being (i) parallel to each other, (ii) spaced apart from each other, and (iii) at an angle to the polymeric strands in the first set;
the polymeric strands in the first and second sets of polymeric strands (i) being woven together so that they meet each other at crossover sections at which the polymeric strands are not bonded together, and (ii) forming open apertures which have an aperture size, measured by the procedure of ASTM D-4751, which is less than 600 μm (0.500 mm)
   2) has a percentage open area, measured by COE 02215-86, of 8-60%, and
   3) has a length which can be changed elastically by 0.1% and which, after that change in length, has a percentage open area, measured by COE 02215-86, of 8-60%, and comprises open apertures which have an aperture size, measured by the procedure of ASTM D-4751, which is less than 600 μm (0.500 mm).

2. A barrier material according to claim 1 which has been installed as a barrier along an extended barrier line.

3. A method for installing a barrier, the method comprising
   (A) providing a barrier material according to claim 1 which is in the form of a roll which comprises the barrier material wrapped around a core;
   (B) unwrapping the barrier material from the core;
   (C) creating a barrier by installing the barrier material, the barrier being installed as the barrier material is unwrapped from the core or after it has been unwrapped from the core.

4. A method for cleaning a barrier which has been created by the method of claim 3 and which has been in use over a period of time and is, therefore, contaminated, the method comprising removing the barrier material, cleaning the removed barrier material by a process which includes passing the removed barrier material over a plurality of rollers on or between which the barrier is cleaned at least partially by water and/or-by steam.

5. A filter material which
   (1) comprises
      (A) a first set of polymeric strands, the polymeric strands in the first set being (i) parallel to each other and (ii) spaced apart from each other, and
      (B) a second set of polymeric strands, the polymeric strands in the second set being (i) parallel to each other, (ii) spaced apart from each other, and (iii) at an angle to the polymeric strands in the first set;
   the polymeric strands in the first and second sets of polymeric strands (i) being woven together so that they meet each other at crossover sections at which the polymeric strands are not bonded together, and (ii) forming open apertures which have an aperture size, measured by the procedure of ASTM D-4751, which is less than 600 μm (0.500 mm),
   (2) has a percentage open area, measured by COE 02215-86, of 8-60%, and
   (3) has a length which can be changed elastically by 0.1% and which, after that change in length, has a percentage open area, measured by COE 02215-86, of 8-60% and comprises open apertures which have an aperture size, measured by the procedure of ASTM D-4751, which is less than 600 urn (0.500 mm).

6. A barrier material according to claim 1 wherein the first and second sets of polymeric strands in the filter material are at an angle of 70-90° to each other and the filter material has a percentage open area, measured by COE 02215-86, of 8-15%.

7. A barrier material according to claim 1 wherein the filter material has a thickness of less than 0.060 inch.

8. A barrier material according to claim 1 wherein the filter material has a length which is at least 25 feet and which can be changed elastically by more than 0.1% and which, after the change in length, has a percentage open area, measured by COE 02215-86, of 8-60% and comprises open apertures which have an aperture size, measured by the procedure of ASTM D-4751, which is less than 600 μm (0.500 mm).

9. A barrier material according to claim 1 wherein the elongate load-bearing apertured material comprises
(A) a first set of melt-extruded polymeric strands which are parallel to each other and spaced apart from each other, the distance between adjacent strands being 0.1-0.5 inch, and
(B) a second set of melt-extruded polymeric strands which are parallel to each other and spaced apart from each other, the distance between adjacent strands being 0.1-0.5 inch, and the strands in the second set being at an angle of 70-90° to the strands in the first set;
the first and second sets of polymeric strands (i) intersecting at crossover sections at which the polymeric strands are bonded together, and (ii) forming open apertures which have an aperture size, measured by the procedure of ASTM D-4751, which is less than 500 μm (0.500 mm).

10. A barrier material according to claim 1 wherein the elongate load-bearing apertured material is a polymeric sheet material comprising perforations.

11. A barrier material according to claim 1 wherein the size of the apertures in the load-bearing apertured material is at least 8 times the size of the apertures in the filter material.

12. A filter material according to claim 1 wherein the first and second sets of polymeric strands in the filter material are at an angle of 70-90° to each other and the filter material has a percentage open area, measured by COE 02215-86, of 8-15%.

13. A filter material according to claim 1 having a length which is at least 25 feet and which can be changed elastically by more than 0.1%; and which, after that change in length, has a percentage open area, measured by COE 02215-86, of 8-60% and comprises open apertures which have an aperture size, measured by the procedure of ASTM D-4751, which is less than 600 μm (0.500 mm).

14. A barrier material which comprises
(1) an elongate load-bearing apertured material which comprises apertures and
(2) an elongate filter material which (i) is attached to at least part of the load-bearing apertured material and (ii) comprises apertures which are substantially smaller than the apertures in the elongate load-bearing apertured material;
wherein the filter material
1) comprises
(A) a first set of polymeric strands, the polymeric strands in the first set being (i) parallel to each other and (ii) spaced apart from each other, and
(B) a second set of polymeric strands, the polymeric strands in the second set being (i) parallel to each other, (ii) spaced apart from each other, and (iii) at an angle to the polymeric strands in the first set;
the polymeric strands in the first and second sets of polymeric strands (i) being woven together so that they meet each other at crossover sections at which the polymeric strands are not bonded together, and (ii) forming open apertures which have an aperture size, measured by the procedure of ASTM D-4751, which is less than 600 μm (0.500 mm);
2) has a percentage open area, measured by COE 02215-86, of 8-60%, and
3) has a length which can be changed elastically by 0.1% and which, after that change in length, has a percentage open area, measured by COE 02215-86, of 8-60% and comprises open apertures which have an aperture size, measured by the procedure of ASTM D-4751, which is less than 600 μm (0.500 mm);
the barrier material being in the form of multiple layers wrapped around a core.

15. A barrier material according to claim 14 wherein the core has a diameter of 1-6 inch.

16. A barrier material according to claim 14 which has a length of at least 25 feet.

17. A barrier material according to claim 14 wherein each of the layers consists essentially of the load-bearing material and the filter material attached to it.

18. A barrier material according to claim 14 wherein the elongate load-bearing apertured material comprises
(A) a first set of melt-extruded polymeric strands which are parallel to each other and spaced apart from each other, the distance between adjacent strands being 0.1-0.5 inch, and
(B) a second set of melt-extruded polymeric strands which are parallel to each other and spaced apart from each other, the distance between adjacent strands being 0.1-0.5 inch, and the strands in the second set being at an angle of 70-90° to the strands in the first set;
the first and second sets of polymeric strands (i) intersecting at crossover sections at which the polymeric strands are bonded together, and (ii) forming open apertures which have an aperture size, measured by the procedure of ASTM D-4751, 200-400 μm which is less than 500 μm (0.500 mm).

19. A barrier material according to claim 14 wherein the elongate load-bearing apertured material is a polymeric sheet material comprising perforations.

20. A barrier material according to claim 14 wherein the size of the apertures in the load-bearing apertured material is at least 8 times the size of the apertures in the filter material.

* * * * *